FIG.1

United States Patent Office 3,454,874
Patented July 8, 1969

3,454,874
INSTRUMENT FOR MEASURING THE THICKNESS OF A NON-CONDUCTING FILM ON A METAL BASE AND FOR MEASURING THE RESISTIVITY OF A METAL SAMPLE
Reginald Searles Young, Denham, England, assignor to The British Aluminium Company Limited, London, England, a company of Great Britain
Continuation-in-part of application Ser. No. 314,264, Oct. 7, 1963. This application Mar. 8, 1965, Ser. No. 437,853
Claims priority, application Great Britain, Oct. 11, 1962, 38,575/62
Int. Cl. G01r 27/00
U.S. Cl. 324—34
1 Claim

ABSTRACT OF THE DISCLOSURE

An electrical instrument for measuring the thickness of a film or coating of a substantially electrically non-conducting material on a metal base material or for measuring the resistivity of a metal sample comprises a Gouriet type oscillator incorporating a unidirectional current-conducting device having at least three electrodes and having a pair of series connected capacitors electrically connected across a series LC circuit and modified by a negative feed-back resistance connected between an electrode of the device and the junction of the pair of capacitors, a tuned circuit electrically connected across the inductor of the series LC circuit, an investigating coil inductively coupled to the tuned circuit and means for providing an indication of the amplitude of oscillation of the oscillator.

---

This application is a continuation-in-part of U.S. application Ser. No. 314,264 filed Oct. 7, 1963 and now abandoned.

This invention relates to improvements in electrical measuring instruments and is particularly concerned with instruments capable of measuring the thickness of a film or coating of substantially electrically non-conducting material on a metal base material and also capable of measuring the resistivity of a metal sample.

According to the present invention, an electrical instrument for measuring the thickness of a film or coating of a substantially electrically non-conducting material on a metal base material or for measuring the resistivity of a metal sample comprises a Gouriet type oscillator incorporating a unidirectional current-conducting device having at least three electrodes and having a pair of series connected capacitors electrically connected across a series L.C. circuit and modified by a negative feed-back resistance connected between an electrode of the device and the junction of the pair of capacitors, a tuned circuit electrically connected across the inductor of the series L.C. circuit, an investigating coil inductively coupled to the tuned circuit and means for providing an indication of the amplitude of oscillation of the oscillator.

Some embodiments of the invention will now be described by way of example, reference being made to the accompanying drawings in which:

FIG. 1 is a circuit diagram of an instrument according to the invention, and

Figure 1:
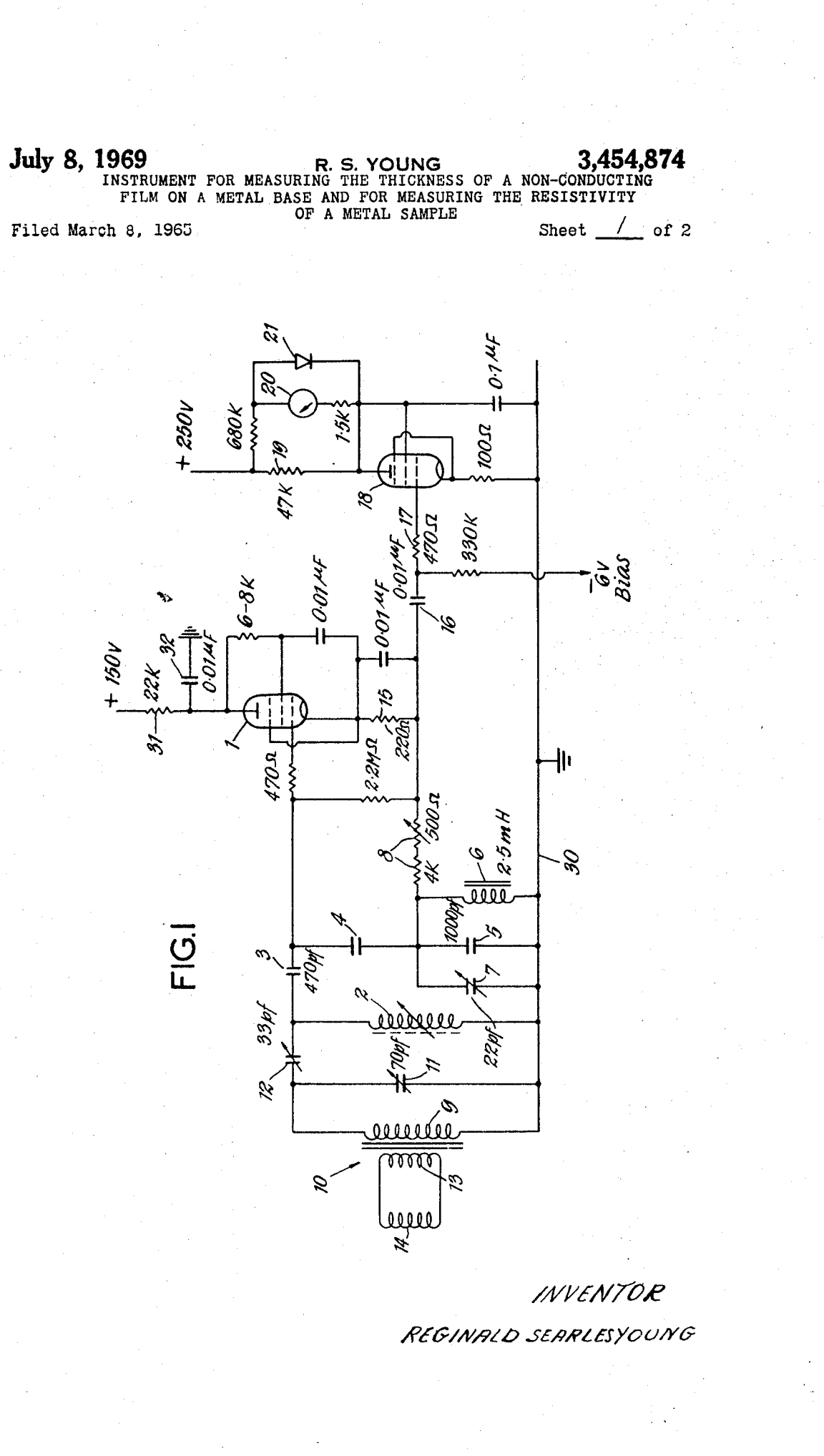
Figure 2:
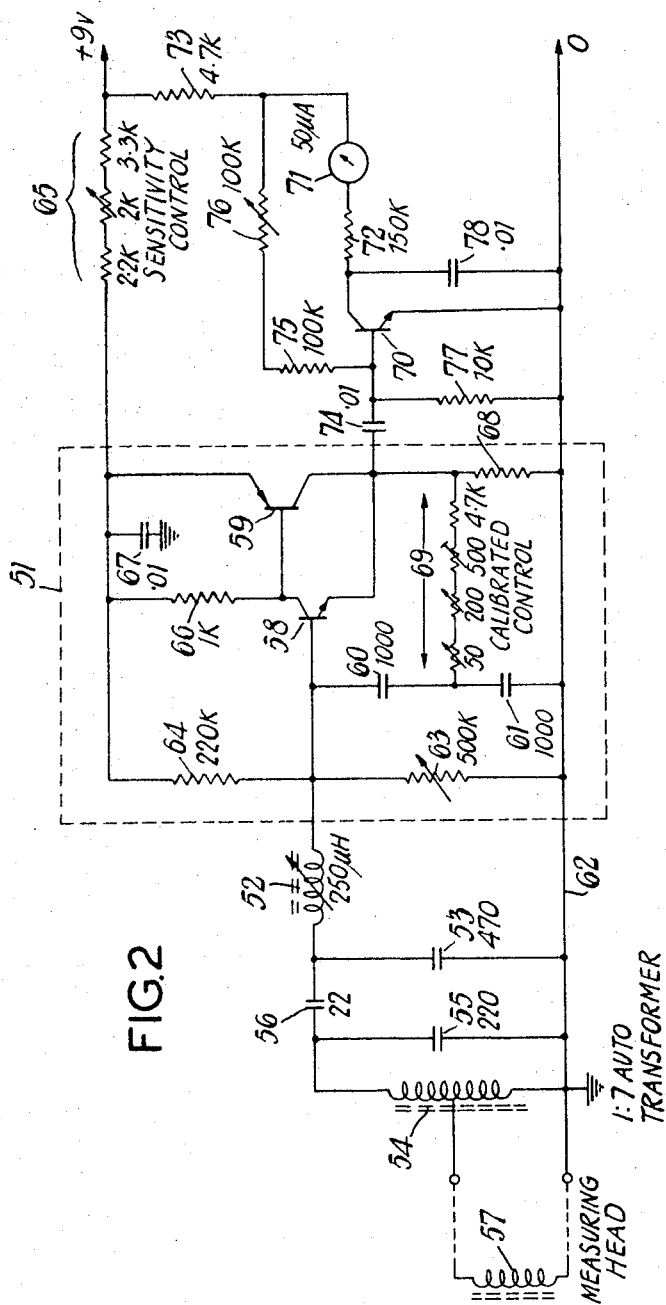
FIG. 2 is a circuit diagram of an alternative instrument according to the invention.

The instrument illustrated in FIG. 1 incorporates a basic form of Gouriet type oscillator such as is described in "Wireless Engineer" April 1950, pages 105 to 112. The oscillator broadly comprises a thermionic valve 1 having the control grid electrically connected to a series L.C. circuit composed of an inductor 2 having a variable iron dust core and a capacitor 3 across which circuit is electrically connected a pair of series capacitors 4 and 5, the cathode of the valve being electrically connected to the junction of the capacitors 4 and 5 and the capacitor 5 being shunted by an R.F. choke 6 which provides a D.C. path for the anode current of the valve 1. For the purpose of this invention the valve 1 desirably is selected to have a high slope characteristic and specifically an E.F. 184 valve is preferred having a slope of about 15 ma./v.

The capacitor 5 is shunted by a variable capacitor 7, and the Gouriet circuit is modified by the provision of negative feed-back in the form of a resistor 8 connected between the cathode of the valve 1 and the junction of the capacitors 4 and 5, at least a part of the resistor 8 being variable. For temperature compensating purposes, part of this resistor may be a temperature sensitive resistor such as a thermistor. This feed-back connection ensures a stable amplitude of oscillation of the oscillator.

A parallel and tuned circuit in the form of the secondary winding 9 of a transformer 10 and a variable capacitor 11 is electrically connected across the inductor 8 through a further variable capacitor 12. The primary winding 13 of the transformer 10 is connected across an investigating coil 14 carried in an investigating head (not shown). The investigating head is conveniently constructed in accordance with our disclosure in U.S. Patent No. 3,260,927 granted July 12, 1966. The cathode of the valve 1 is connected to the resistor 8 through a resistor 15. The capacitors 5, 7 and 11 and the inductor 2 and secondary winding 9 are all connected to a common line 30 which is shown as being earthed. The anode of the valve 1 is connected through a resistor 31 to the positive pole of an H.T. supply and also to earth via a capacitor 32. Thus the cathode and control grid of the valve 1 are electrically connected across the capacitor 4 and the cathode and anode of the valve 1 are electrically connected across the capacitor 5. The junction of the resistors 8 and 15 is connected through a capacitor 16 and a parasitic suppressor resistor 17 to the control grid of a further valve 18 which, conveniently, is similar to the valve 1. The cathode of the valve 18 is electrically connected to the earth line 30 so that the output of the valve 1 is effectively applied to the input of the valve 18. A resistor 19 is incorporated in the anode circuit of the valve 18 and a voltage develops thereacross which is proportional to the amplitude of oscillation of the oscillator. This voltage is detected by a 100/μ A. full scale deflection ammeter 20 connected across the resistor 19 and shunted by a diode 21 to prevent over-loading the meter 20 in the case of an over-voltage developing.

In the use of the instrument described above for the measurement of the thickness of a film or coating of substantially non-electrically conducting material on a metal base, the instrument is set up (after a warming-up period of about 15 minutes) to be independent of the resistivity of the metal base. This is achieved by placing the investigating head on an uncoated sample of a metal having a low resistivity, e.g. pure aluminium, and adjusting the values of the capacitors 11 and 12 and of the inductance of inductor 2 (which has a variable core) to give oscillations of a selected amplitude as observed on the meter 20. The investigating head is then placed on a sample of a metal having a higher resistivity, e.g. an aluminium alloy, and adjusting the value of the capacitor 12 and, if necessary, of capacitor 11 and inductor 2 to give the same selected amplitude of oscillation as observed by the meter 20. The two samples are then checked to make sure that they both give the same amplitude of oscillation.

In this setting-up procedure, the frequency of the parallel tuned circuit which includes inductor 9 and capacitor 11 is made less than that of the oscillator proper and as primarily determined by the series circuit of inductor 2 and capacitor 3. The tuned frequency of this parallel tuned circuit is adjusted together with adjustment of the value of the coupling capacitor 12 so that the resistive component seen at the input grid of the valve 1 remains constant and independent of the resistivity of the metal beneath the investigating head. Thus an increase in resistivity of the metal sample beneath the investigating head lowers the tuned frequency of the parallel tuned circuit 9, 11 with consequent lowering of the loading of the circuit on the main oscillator coil 2 and an increase in its impedance. At the same time, the Q of the investigating head assembly is reduced by the increased resistivity and the increased loss lowers the impedance of the main oscillator coil 2. Thus by suitable adjustment of the coupling capacitor 12 and the tuned frequency of the parallel tuned circuit, the tuned frequency shift of the investigating head assembly can be made to compensate for the resistivity change in the metal sample so as to maintain a constant resistive component at the input to the valve 1.

Any increase in separation of the investigating head with the coil 14 from the base metal has the effect of lowering the tuned frequency of the parallel tuned circuit 9, 11 and of reducing its losses. These effects are additive and increase the tuned impedance of the main oscillator coil 2 resulting in a greater amplitude of oscillation as seen by the meter 20. Thus, when the investigating head is placed on a metal sample having a film or coating of electrically substantially non-conducting material, the departure of the amplitude of the oscillation as seen by the meter 20 from that selected during the setting up procedure represents the thickness of the film or coating. Whilst the meter 20 may be calibrated to give a reading representing this thickness, it is preferred to adjust the value of the capacitor 7 to bring the amplitude of oscillation back to its selected value and to calibrate the capacitor 7 in terms of film thickness.

The instrument described has proved to be highly stable and accurate and film thicknesses as low as 1 micron may be consistently measured. One application for the instrument is in the measurement of the thickness of the anodic film on aluminium or aluminium alloy sheet used for motor vehicle trim.

It will be appreciated that the meter 20 may be replaced by or associated with recording means for providing a record of the film thicknesses being measured and that the instrument may have application in the measurement of film thicknesses in continuous processes. An alarm may, for example, be arranged to operate when the amplitude of oscillation and hence the film thickness falls below a predetermined value.

The instrument described may also be used for measuring the resistivity of metal sample independently of film thickness. This is achieved by setting up the instrument to be independent of film thickness by tuning the parallel tuned circuit 9, 11 to a frequency higher than that of the main tuned circuit 2, 3, and by adjustment of the coupling capacitor 12. In this case, an increase in separation of the investigating head from the metal lowers the frequency of the parallel tuned circuit 9, 11 and causes it to approach that of the main tuned circuit 2, 3 thereby lowering the impedance of the latter. The circuit is so adjusted that this reduction compensates the increase in impedance due to the increased Q of the investigating head assembly produced by increased separation from the metal. With this particular arrangement, compensation is at the optimum for only one value of base metal resistivity. Better compensation may be achieved by interchanging the secondary winding 9 of the transformer 10 with the inductor 2, the investigating coil 14 remaining inductively coupled with the secondary winding 9 through the primary winding 14. In this case, the parallel tuned circuit (now composed of inductor 2 and capacitor 11) is tuned to a frequency lower than that of the series circuit (now composed of secondary winding 9 and capacitor 3 plus reflective components from the investigating coil 14 and primary winding 13). The effect of this is that as the spacing between the investigating coil 14 and the metal sample increases, the losses of the series tuned circuit are reduced and the frequency of oscillation of the series circuit is reduced to approach that of the parallel tuned circuit so that more energy is transferred to the parallel tuned circuit. This change in the energy transferred to the parallel tuned circuit is of opposite sense to the change in energy losses from the series circuit so that these can be made to compensate for each other and the instrument be made insensitive to the spacing of the investigating coil from the metal sample and hence of film thickness. At the same time, an increase in resistivity of the metal sample increases the losses of the series circuit and reduces the frequency of oscillation thereof so that energy transferred to the parallel tuned circuit also increases. Thus the change in the losses of the series circuit due to changes of resistivity of the metal sample is in the same sense as the energy losses due to transfer to the parallel tuned circuit and the amplitude of oscillation is varied accordingly. Thus the amplitude of oscillation is a measure of the resistivity of the metal sample and is independent of film thickness. In this case, the capacitor 7 may be omitted and the resistor 8 are a part thereof made variable and calibrated so that adjustment of the magnitude of the resistance of the resistor 8 to maintain the amplitude of oscillation constant will provide a measure of the resistivity of the metal sample.

In the instrument described above, the non-linearity of the valve 1 was of such low value that the amplitude sensitivity of the oscillator circuit due to circuit non-linearity was largely controlled by the hysteresis of the dust core of the inductor 2.

It will be appreciated that the thermionic valves 1 and 18 described above may be replaced by transistors and a circuit so modified is shown in FIG. 2.

The instrument of this example is in many respects similar to that described with reference to FIG. 1. It comprises a variable negative resistance stage 51 having a series L.C. circuit connected across the input thereof. The series L.C. circuit comprises an inductor 52 having a variable iron dust core and a capacitor 53. The inductor 52 and capacitor 53 may be interchanged. A parallel tuned circuit in the form of an auto-transformer tuned circuit in the form of an auto-transformer winding 54 and capacitor 55 is electrically connected across the capacitor 53 through a further capacitor 56. The tapped portion of the winding 54 is connected across an investigating coil 57 carried in an investigating head (not shown). The investigating head is conveniently constructed in accordance with the disclosure in U.S. Patent No. 3,260,927 granted July 12, 1966.

The negative resistance stage comprises a pair of complementary transistors 58 and 59 connected in cascade. These transistors are of the high frequency type with low collector capacities so as to minimize temperature effects. In this example, the transistor 58 is an n-p-n silicon type and the transistor 59 is a p-n-p germanium type although it could equally be a p-n-p silicon type. The series L.C. circuit of inductor 52 and capacitor 53 is connected across a pair of series connected capacitors 60 and 61 which are connected between earth line 62 and the base of transistor 58. A variable resistor 63 is connected across the capacitors 60 and 61 and a further resistor 64 is connected between the base of transistor 58 and through a variable resistor 65 to the positive pole of the D.C. supply. The collector of the transistor 58 is connected through a resistor 66 to the emitter of the transistor 59 and to the resistor 65 and also through a capacitor 67 to earth. The collector of the transistor 58 is also connected to the base of the transistor 59. The collector of the transistor 59 is connected to the emitter of the transistor 58 and is also connected through a resistor 68 of low value—e.g. 330 ohms, to the earth line 62. The collector of the transistor 59 is also connected through a variable feed-back resistor 69 (shown as four series connected resistors) to the junction of the series connected capacitors 60 and 61.

The output from the stage 51 is taken across the resistor 68 and is applied to a meter stage which includes an n-p-n transistor 70 and a meter 71 connected through a resistor 72 to the collector of transistor 70 and through a resistor 73 to the positive pole of the D.C. supply. The base of transistor 70 is connected through a capacitor 74 to the collector of transistor 59 and through resistors 75 and 76 connected in series with resistor 73 to the positive pole of the D.C. supply. A resistor 77 is connected between the base of transistor 70 and the earth line 62 and a capacitor 78 is connected between the collector of the transistor 70 and the earth line 62, the latter, as will be understood, being connected to the negative pole of the D.C. supply.

In the use of the instrument described above for the measurement of thickness of a film or coating of substantially non-electrically conducting material on a metal base, the instrument is set up to be independent of the resistivity of the metal base. This is achieved by placing the investigating head on an uncoated sample of a metal having a low resistivity, e.g. pure aluminium, and adjusting the values of the inductor 52 (which has a variable core) and of the resistor 69 to give oscillations of a selected amplitude as observed on the meter 70. The investigating head is then placed on a sample of a metal having a higher resistivity, e.g. an aluminium alloy, the values of the inductor 52 and the resistor 69 are again adjusted to give the same selected amplitude of oscillation. The two samples are then checked again and further adjustments made as may be necessary to give the same amplitude of oscillation. The frequency of the series L.C. circuit is now greater than that of the parallel tuned circuit so that the resistive component seen at the input to the stage 51, remains constant and independent of the metal sample beneath the investigating head. Thus, an increase in the resistivity of a metal sample beneath the investigating head lowers the frequency of the parallel tuned circuit 54, 55, with a consequent lowering of the loading of the circuit on the main oscillator coil 52 and an increase in its impedance. At the same time, the Q of the investigating head assembly is reduced by the increased resistivity and the increased loss lowers the impedance of the main oscillator coil 52. Thus, by suitable adjustment of the tuned frequency of the series L.C. circuit 52, 53, the tuned frequency shift of the investigating head assembly can be made to compensate for the resistivity change in the metal sample so as to maintain a constant resistive component at the input to the stage 51.

Any increase in separation of the investigating head with the coil 57, from the base metal has the effect of lowering the tuned frequency of the parallel tuned circuit 54, 55 and of reducing its losses. These effects are additive and increase the tuned impedance of the main oscillator coil 52 resulting in a greater amplitude of oscillation as seen by the meter 71. Thus, when the investigating head is placed on a metal sample having a film or coating of electrically substantially non-conducting material, the departure of the amplitude of the oscillation as seen by the meter 71, from that selected during the setting up procedure represents the thickness of the film or coating. Whilst the meter 71 may be calibrated to give a reading representing this thickness, it is preferred to adjust the value of the feed-back resistor 69 to bring the amplitude of oscillation back to its selected value and to calibrate the resistor 69 or a part thereof in terms of film thickness. The sensitivity of the instrument is controlled by adjusting the value of the resistor 65 which controls the magnitude of the D.C. supply voltage applied across the stage 51.

The stage 51 has a high internal gain which may be of the order of 1,000 due to the cascaded transistors 58 and 59 but is so arranged as to have a low output impedance which is less than 10 ohms but is preferably of the order of a ½ ohm. The stage 51 also has a relatively high input impedance which may be of the order of 50,000 ohms. The effect of the low output impedance of the stage 51 is to prevent variations in the input impedance of the meter stage being reflected back in the circuit so that a highly stable instrument results which is capable of measuring accurately film thicknesses as low as 1 micron.

The instrument described can be made very compactly and is readily portable and is of use, for example, in measuring the thickness of the anodic film on aluminium or aluminium alloy sheet used for motor vehicle trim.

Although the instrument described is primarily intended for measuring the thickness of a substantially non-electrically conducting film or coating on a metal base, it is also capable of being used to measure the resistivity of a metal base independently of the thickness of a substantially non-electrically conducting film or coating. This is achieved by substituting the capacitor 53 for the inductor 52, by substituting the inductor 52 for the auto-transformer winding 54 and investigating coil 57 and by connecting the auto-transformer winding 54 between the junction of the capacitors 56 and 53 and the earth line 12. In this case, the inductor 52 is tuned to provide a tuned frequency which is lower than that provided by the new series circuit 54, 53.

I claim:
1. An electrical measuring instrument comprising a variable negative resistance stage having an input and an output and incorporating a pair of transistors connected in cascade, a series L.C. circuit incorporating a first inductor and a first capacitor connected across the input to said negative resistance stage, a parallel tuned circuit incorporating a transformer winding and a second capacitor electrically connected across said first capacitor and investigating coil electrically connected across at least a part of said transformer winding, third and fourth series connected capacitors connected across said series L.C. circuit, an output resistor, a feed-back resistor connected to the junction of said third and fourth capacitors and connected in series with said third capacitor across the base and emitter electrodes of the first one of said transistors and connected in series with said fourth capacitor across said output resistor, and a meter stage incorporating a meter and a further transistor connected to said output resistor.

References Cited
UNITED STATES PATENTS

| | | | |
|---|---|---|---|
| 1,815,717 | 7/1931 | Kranz | 324—40 |
| 2,581,394 | 1/1952 | Dinger | 324—40 X |
| 2,772,393 | 11/1956 | Davis | 324—40 |
| 2,919,413 | 12/1959 | Charles | 324—34 X |
| 2,920,268 | 1/1960 | Young | 324—40 X |
| 2,920,269 | 1/1960 | Hanysz et al. | 324—40 X |
| 2,928,043 | 3/1960 | Foerster | 324—34 |
| 2,933,677 | 4/1960 | Lieber | 324—40 X |
| 2,939,073 | 5/1960 | Eul | 324—40 |
| 3,135,914 | 6/1964 | Callan et al. | 324—40 |
| 3,260,927 | 7/1966 | Young | 324—40 X |

RUDOLPH V. ROLINEC, *Primary Examiner.*

R. J. CORCORAN, *Assistant Examiner.*

U.S. Cl. X.R.

324—40